United States Patent
Kato et al.

(10) Patent No.: US 7,309,539 B2
(45) Date of Patent: Dec. 18, 2007

(54) FUEL CELL STACK

(75) Inventors: Hideo Kato, Utsunomiya (JP);
Katsumi Hayashi, Utsunomiya (JP);
Yosuke Fujii, Kawachi-gun (JP);
Masahiko Sato, Utsunomiya (JP);
Hideo Okamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 556 days.

(21) Appl. No.: 10/695,919

(22) Filed: Oct. 28, 2003

(65) Prior Publication Data

US 2004/0157099 A1    Aug. 12, 2004

(30) Foreign Application Priority Data

Oct. 28, 2002  (JP) ............... 2002-313272

(51) Int. Cl.
*H01M 8/02* (2006.01)
*H01M 8/04* (2006.01)

(52) U.S. Cl. .......................................... 429/26; 429/34
(58) Field of Classification Search ...................... None
See application file for complete search history.

(56) References Cited

U.S. PATENT DOCUMENTS

2002/0068207 A1   6/2002  Baldauf et al.

2003/0068541 A1 *   4/2003  Sugiura et al. ............... 429/26

FOREIGN PATENT DOCUMENTS

| EP | 1 239 530 A2 | 9/2002 |
|---|---|---|
| JP | 07-326379 | 12/1995 |
| JP | 08130028 A | 5/1996 |
| JP | 08167424 | 6/1996 |
| JP | 08306380 | 11/1996 |

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

A fuel cell stack includes a cell assembly formed by stacking a plurality of fuel cells in a stacking direction. Terminal plates are provided outside opposite ends of the cell assembly in the stacking direction. An electrically conductive first heat insulation plate is interposed between one end of the cell assembly and the terminal plate, and an electrically conductive second heat insulation plate is interposed between the other end of the cell assembly and the terminal plate. The first and second heat insulation plates are metal corrugated plates. Heat insulation air chambers are defined between the first and second heat insulation plates and the cell assembly.

4 Claims, 6 Drawing Sheets

FUEL CELL STACK

BACKGROUND OF THE INVENTION

1. Field of the Invention

The present invention relates to a fuel cell stack formed by stacking a plurality of fuel cells each including an electrolyte electrode assembly and a pair of separators for sandwiching the electrolyte electrode assembly. The electrolyte electrode assembly includes a pair of electrodes, and an electrolyte interposed between the electrodes.

2. Description of the Related Art

Generally, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

Some of the fuel cells in the fuel cell stack are cooled down easily due to heat radiation to the outside in comparison with the other fuel cells. For example, fuel cells (end cells) provided at opposite ends of the fuel cell stack radiate heat to the outside through terminal plates for collecting electric energy generated in the fuel cells, and end plates for tightening the fuel cells. The temperature of the end cells is likely to be dropped excessively.

Due to the temperature drop, water vapor may condense into liquid water easily at the end cells in comparison with fuel cells provided in the middle of the fuel cell stack in the stacking direction. The water produced in the reaction in the fuel cell stack may not be discharged smoothly from the fuel cell stack. Thus, the desired power generation performance may not be achieved. In particular, if a coolant flow field for supplying a coolant to the fuel cell stack is provided adjacent to the terminal plate, and operation of the fuel cell stack is started at a temperature below the freezing point, heat energy generated in the end cell is absorbed by the coolant, and transmitted to the terminal plate. Thus, the end cell is not warmed up efficiently. Consequently, voltage drop may occur undesirably.

In an attempt to address the problem, Japanese Laid-Open patent publication No. 8-130028 discloses a solid polymer electrolyte fuel cell in which separators of end cells provided at opposite ends of the fuel cell stack do not have any grooves as passages for cooling fluid. According to the disclosure, since the outer separators are not cooled by the cooling fluid, it is possible to prevent the end cells from being cooled down excessively.

Japanese Laid-Open patent publication 7-326379 discloses another type of a fuel cell stack in which gas connector plates are provided at opposite ends of a cell stack body. A vacuum layer and an air layer are formed in each of the gas connector plates. The vacuum layer and the air layer jointly function as a heat insulation layer for preventing heat radiation from the cell stack body to the outside.

As described above, Japanese Laid-Open patent publication No. 8-130028 is directed to prevent the end cells from being cooled excessively by the cooling fluid so that water condensation does not occur in the end cells, and Japanese Laid-Open patent publication 7-326379 is directed to prevent heat radiation from the cell stack body to the outside by means of the heat insulating function of the vacuum layer and the air layer.

Basically, both of Japanese Laid-Open patent publication No. 8-130028 and Japanese Laid-Open patent publication 7-326379 provide heat insulating mechanisms operated in an atmosphere having a normal temperature, for insulating the end cells and the cell stack body to maintain the desired power generation performance of the end cells and the cell stack body. The heat insulating mechanisms of these techniques do not function properly when operation of the fuel cell stack is started at an excessively low temperature below the freezing point. In starting operation of the fuel cell stack at such a low temperature, it is necessary to rapidly raise the cell temperature to the desired temperature for power generation to prevent water produced in the fuel cell stack from freezing undesirably.

When operation of the fuel cell stack is started at a temperature below the freezing point, the reactant gas flow field in the gas diffusion layer of the membrane electrode assembly may be closed undesirably by the frozen water. It is necessary to rapidly raise the temperature of the gas diffusion layer adjacent the gas flow field above the freezing point. Japanese Laid-Open patent publication No. 8-130028 and Japanese Laid-Open patent publication 7-326379 do not suggest any technique for keeping the temperature of the gas diffusion layer above the freezing point.

SUMMARY OF THE INVENTION

A general object of the present invention is to provide a fuel cell stack with a simple structure in which voltage drop due to the delay in warming up end cells of the fuel cell stack does not occur, and operation of the fuel cell stack can be started at a low temperature.

According to the present invention, a fuel cell stack includes a cell assembly formed by stacking a plurality of fuel cells in a stacking direction. Terminal plates for collecting electricity from the fuel cell stack are provided outside opposite ends of the cell assembly in the stacking direction. An electrically conductive heat insulation plate is interposed between an end of the cell assembly and one of the terminal plates. An additional electrically conductive heat insulation plate may be interposed between the other end of the cell assembly and the other of the terminal plates. The heat insulation plate is a corrugated plate. A heat insulation air chamber is defined between the heat insulation plate and the cell assembly.

Thus, heat energy generated in the fuel cells is not transmitted to the terminal plates. Since the heat insulation plate is electrically conductive corrugated plate, the area of contact with the fuel cell (end cell) provided at the end of the cell assembly is small. The small contact area results in large heat resistance and large contact resistance. Specifically, heat energy generated in the end cells is reliably prevented from being transmitted from the end cells to the terminal plates through the heat insulation plates, and large heat energy is generated at the contact areas. Consequently, the end cells are warmed up rapidly, and water generated during power generation does not freeze in the membrane electrode assembly.

Protrusions for defining a fluid field may extend along a surface of the separator provided at the end of the cell assembly in the stacking direction such that the protrusions for defining said fluid field face the heat insulation plate. Further, protrusions may extend along a surface of the insulation plate for defining a heat insulation space.

The protrusions for defining the fluid field and the protrusions for defining the heat insulation space are in contact with each other, and the protrusions for defining said fluid field extend across the protrusions for defining the heat insulation space such that a plurality of heat insulation air chambers are formed. Thus, heat insulation characteristics are improved, and the end cells are warmed up desirably in a short period of time.

The protrusions for defining the heat insulation space may have a curved cross section for decreasing the contact area with the end cell. In the arrangement, the heat resistance at the contact area is very large. Therefore, the electrolyte electrode assembly can be warmed up rapidly, and the water generated during power generation does not freeze in the electrolyte electrode assembly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
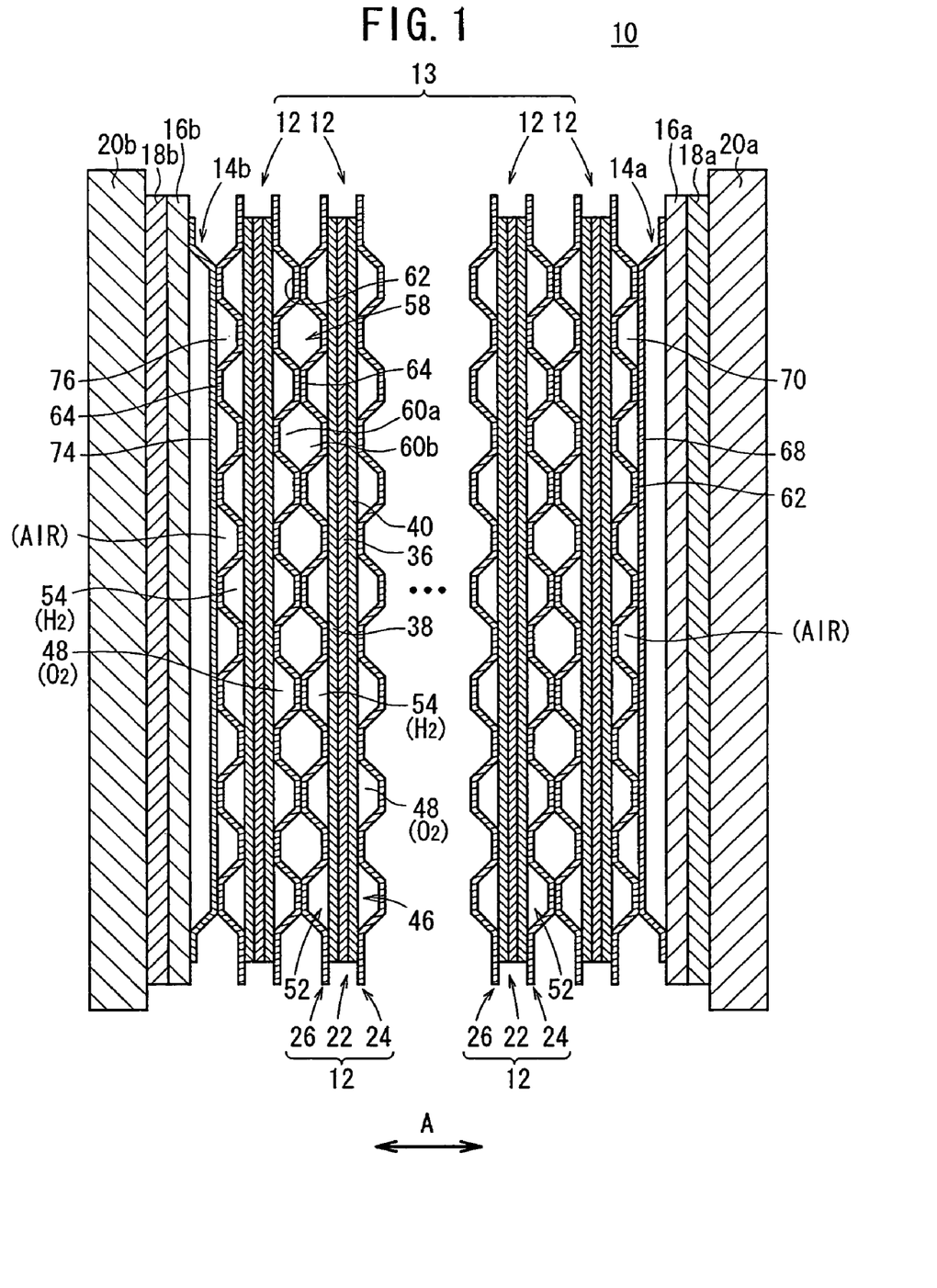
FIG. 1 is a cross sectional view schematically showing a fuel cell stack according to an embodiment of the present invention.

FIG. 1 is a perspective view schematically showing a fuel cell stack 10 according to an embodiment of the present invention. The fuel cell stack 10 includes a cell assembly 13 formed by stacking a plurality of fuel cells 12 in a direction indicated by an arrow A. First and second heat insulation plates 14a, 14b are stacked on the outside of the cell assembly 13 respectively. Positive and negative terminal plates 16a, 16b are stacked on the outside of the first and second heat insulation plates 14a, 14b, respectively. Electrical insulation plates 18a, 18b are stacked on the outside of the positive and negative terminal plates 16a, 16b, respectively. Further, end plates 20a, 20b are stacked on the outside of the electrical insulation plates 18a, 18b, respectively. The end plates 20a, 20b are tightened by a tightening member such as a tie rod (not shown) to form the fuel cell stack 10. In the illustrated embodiment, two heat insulation plates (first and second heat insulation plates 14a, 14b) are used. Alternatively, only one of the first and second heat insulation plates 14a, 14b is used.

Figure 2:
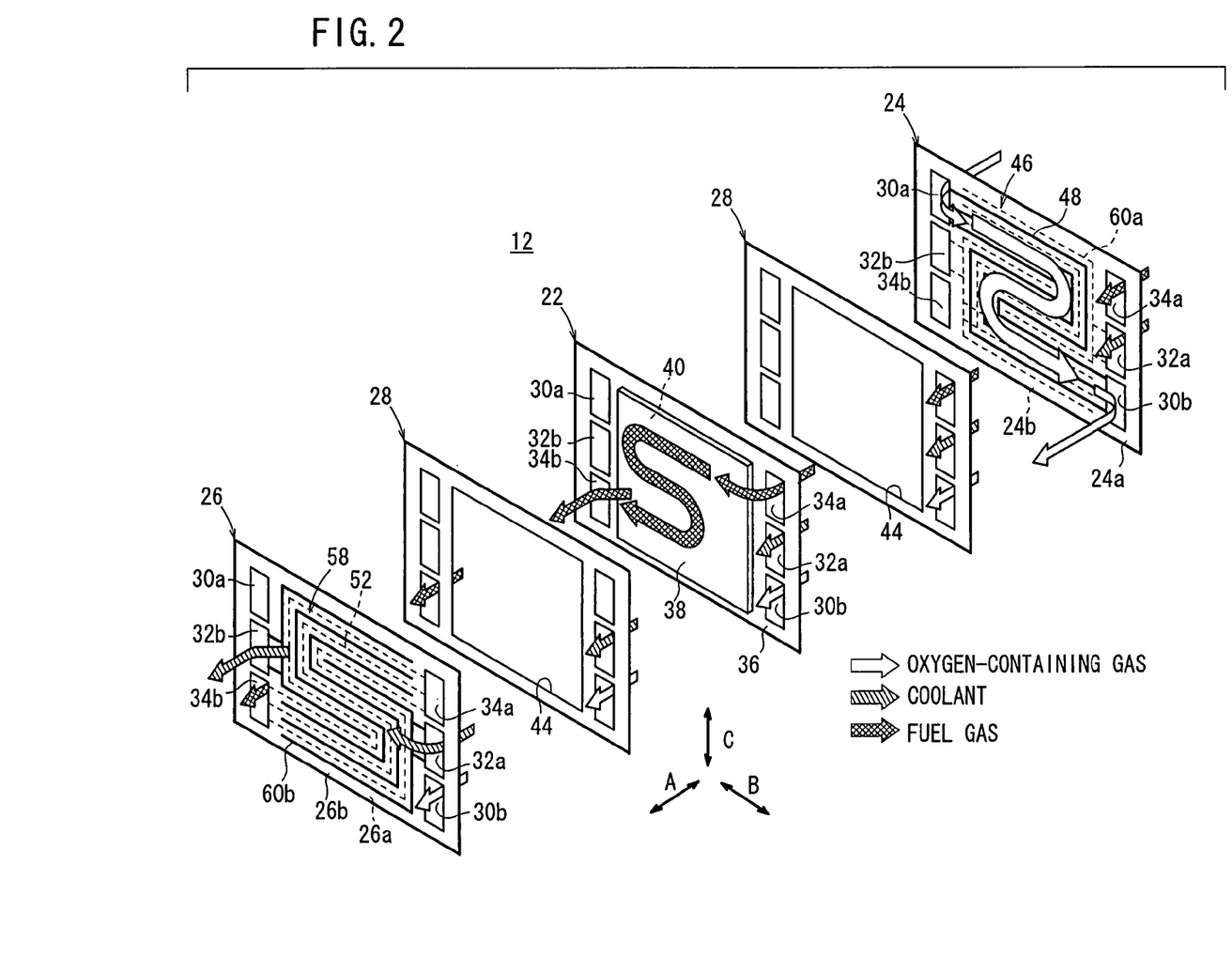
FIG. 2 is an exploded perspective view showing a part of the fuel cell stack.

As shown in FIG. 2, the fuel cell 12 includes a membrane electrode assembly (electrolyte electrode assembly) 22, and first and second metal separators 24, 26 for sandwiching the membrane electrode assembly 22. Seal members 28 such as a gasket are provided between the first and second metal separators 24, 26 for sealing passages as described later and electrode surfaces (power generating surfaces). Surfaces of the first and second metal separators 24, 26 are gold-plated, for example.

At one end of the fuel cell 12 in a direction indicated by an arrow B, an oxygen-containing gas supply passage 30a for supplying an oxygen-containing gas, a coolant discharge passage 32b for discharging a coolant, and a fuel gas discharge passage 34b for discharging a fuel gas such as a hydrogen-containing gas are arranged in a vertical direction indicated by an arrow C. The oxygen-containing gas supply passage 30a, the coolant discharge passage 32b, and the fuel gas discharge passage 34b extend through the fuel cell 12 in the stacking direction indicated by the arrow A.

At the other end of the fuel cell 12 in the direction indicated by the arrow B, a fuel gas supply passage 34a for supplying the fuel gas, a coolant supply passage 32a for supplying the coolant, and an oxygen-containing gas discharge passage 30b for discharging the oxygen-containing gas are arranged in the direction indicated by the arrow C. The fuel gas supply passage 34a, the coolant supply passage 32a, and the oxygen-containing gas discharge passage 30b extend through the fuel cell 12 in the direction indicated by the arrow A.

The membrane electrode assembly 22 comprises an anode 38, a cathode 40, and a solid polymer electrolyte membrane 36 interposed between the anode 38 and the cathode 40 (see FIGS. 1 and 2). The solid polymer electrolyte membrane 36 is formed by impregnating a thin membrane of perfluorosulfonic acid with water, for example.

Each of the anode 38 and cathode 40 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

As shown in FIG. 2, the first metal separator 24 has the oxygen-containing gas flow field 46 on its surface 24a facing the membrane electrode assembly 22. The oxygen-containing gas flow field 46 is connected to the oxygen-containing gas supply passage 30a at one end, and connected to the oxygen-containing gas discharge passage 30b at the other end. The oxygen-containing gas flow field 46 is formed between the cathode 40 and a plurality of grooves (serpentine grooves) 48 extending in a serpentine pattern for allowing the oxygen-containing gas to flow back and forth in the direction indicated by the arrow B, and flows in the direction indicated by the arrow C.

Figure 3:
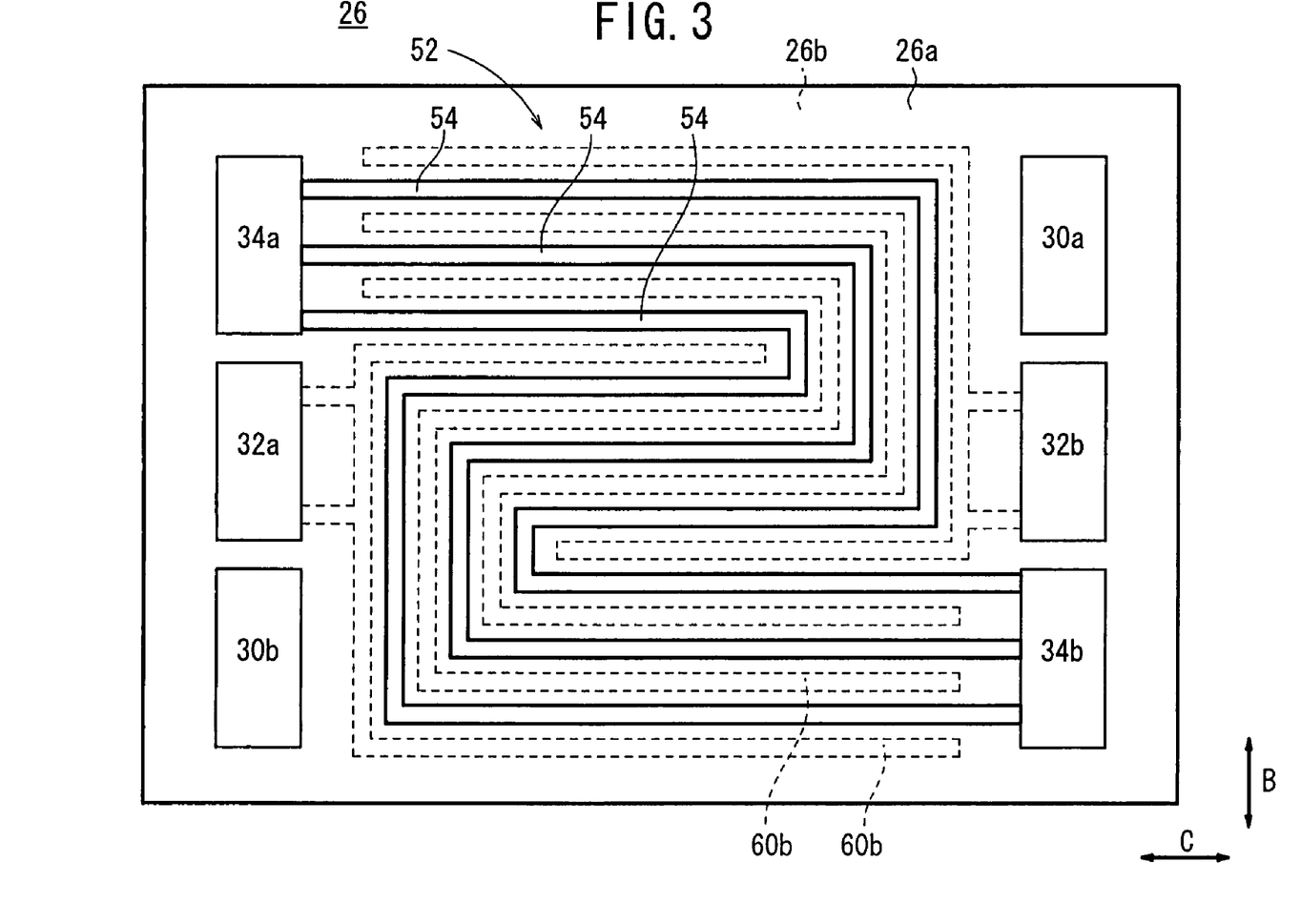
FIG. 3 is a front view showing a second separator of a fuel cell.

As shown in FIG. 3, the second metal separator 26 has the fuel gas flow field 52 on its surface 26a facing the membrane electrode assembly 22. The fuel gas flow field 52 is connected to the fuel gas supply passage 34a at one end, and connected to the fuel gas discharge passage 34b at the other end. The fuel gas flow field 52 is formed between the anode 38 and a plurality of grooves (serpentine grooves) 54 extending in a serpentine pattern for allowing the fuel gas to flow back and forth in the direction indicated by the arrow B, and flows in the direction indicated by the arrow C.

As shown in FIG. 2, a coolant flow field 58 is formed between a surface 24b of the first metal separator 24 and a surface 26b of the second metal separator 26. The coolant flow field 58 is connected to the coolant supply passage 32a at one end, and connected to the coolant discharge passage 32b at the other end. The coolant flow field 58 is formed between grooves (flow field) 60a of the first metal separator 24 and grooves (flow field) 60b of the second metal separator 26 when the first metal separator 24 and the second metal separator 26 are stacked together. The flow field 60a of the first metal separator 24 and the flow field 60b of the second metal separator 26 are combined together to form the coolant flow field 58 comprising the grooves in a serpentine pattern for allowing the coolant to flow back and forth in the direction indicated by the arrow B, and flows in the direction indicated by the arrow C.

As shown in FIG. 1, the first metal separator 24 has first protrusions 62 for defining the grooves (the flow field) 60a, and the second metal separator 26 has second protrusions 64 for defining the grooves (flow field) 60b. The first protrusions 62 are in contact with the second protrusions 64. The first and second protrusions 60, 62 partially extend in the direction indicated by the arrow B, and partially extend in the direction indicated by the arrow C (see two-dot chain lines in FIGS. 4 and 5).

Figure 4:
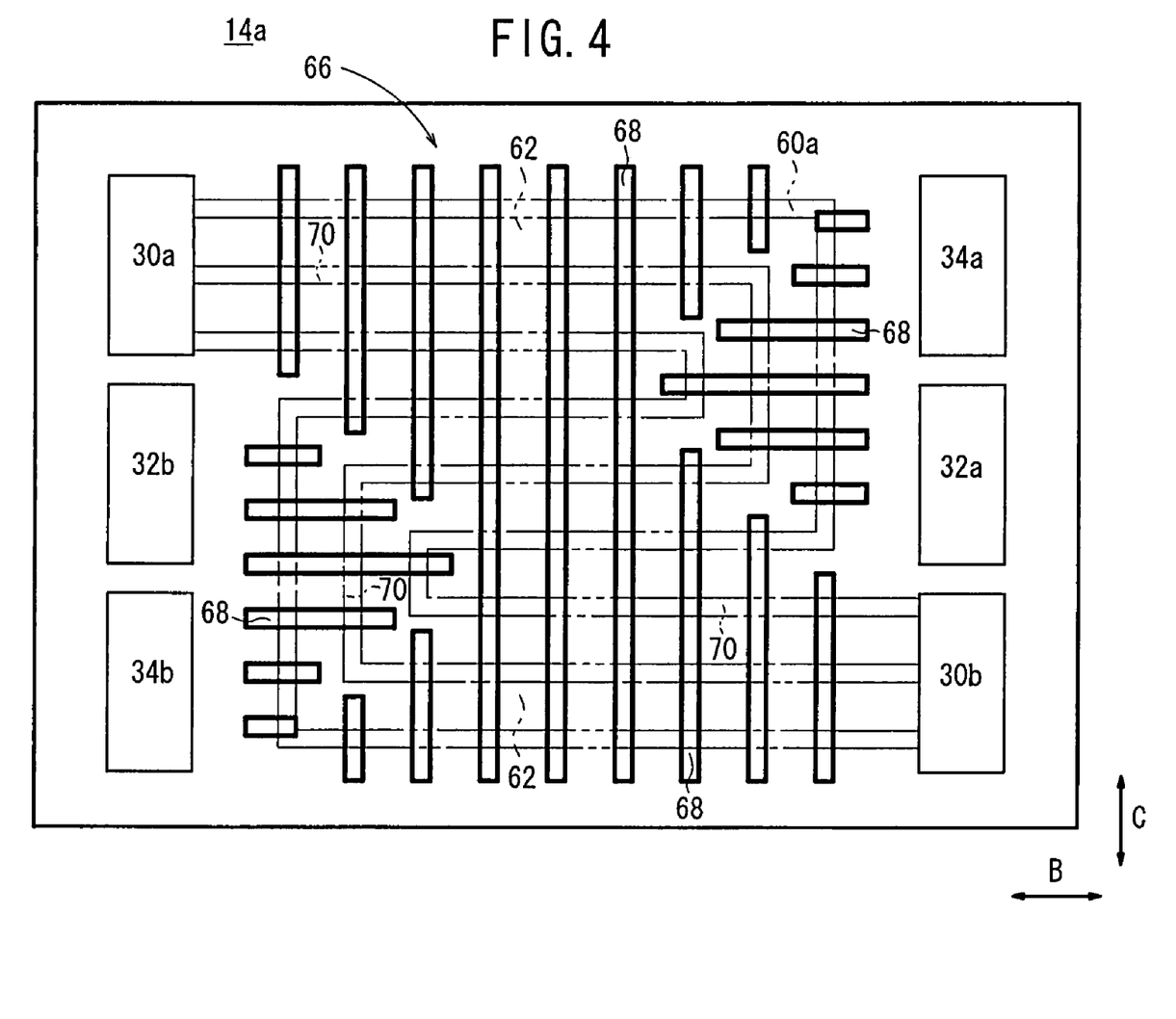
FIG. 4 is a front view showing a first heat insulation plate.

The first heat insulation plate 14a is a corrugated plate made of a metal material such as SUS material of JIS (Japan Industrial Standard). As shown in FIG. 4, a first heat insulation space 66 is formed on a surface of the first heat insulation plate 14a facing the first metal separator 24. The first heat insulation space 66 is defined by a plurality of protrusions 68 arranged to extend across the first protrusions 62 of the first metal separator 24. The protrusions 62 of the first metal separator 24 and first protrusions 68 of the first heat insulation plate 14a are in contact with each other, to define a plurality of heat insulation air chambers 70.

Figure 5:
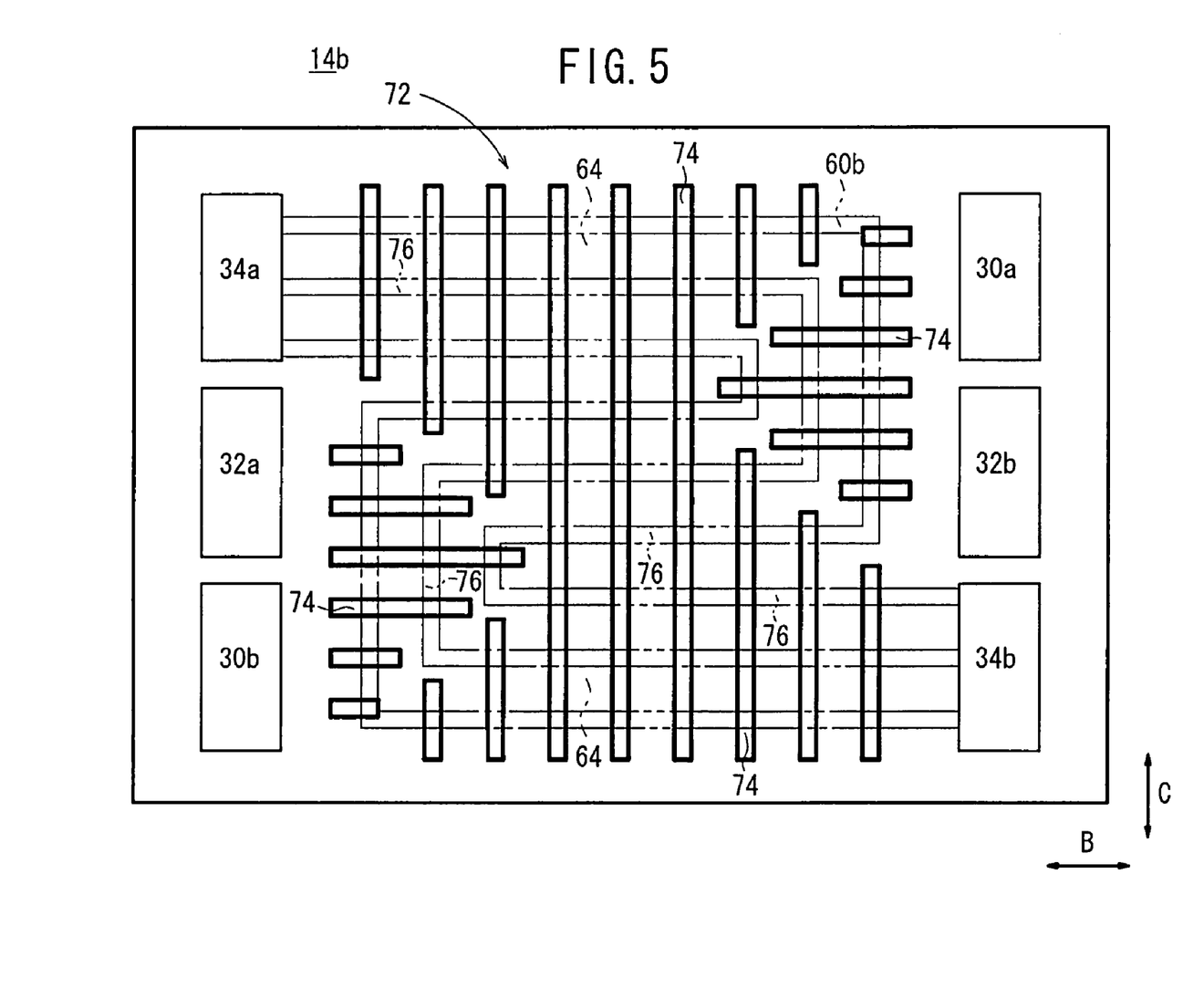
FIG. 5 is a front view showing a second heat insulation plate.

The second heat insulation plate 14b is a corrugated plate made of a metal material as with the first heat insulation plate 14a. As shown in FIG. 5, a second heat insulation space 72 is formed on a surface of the second heat insulation plate 14b facing the second metal separator 26. The second heat insulation space 72 is defined by a plurality of second protrusions 74 extending across the second protrusions 64 of the second metal separator 26. The second protrusions 64 of the second metal separator 26 and the second protrusions 74 of the second heat insulation plate 14b are in contact with each other, to define a plurality of heat insulation air chambers 76.

Next, operation of the fuel cell stack 10 will be described below.

As shown in FIG. 1, an oxygen-containing gas such as air, a fuel gas such as a hydrogen-containing gas, and a coolant such as pure water, an ethylene glycol or an oil are supplied to the cell assembly 13 formed by stacking a plurality of fuel cells 12.

Specifically, as shown in FIG. 2, the oxygen-containing gas flows from the oxygen-containing gas supply passage 30a into the oxygen-containing gas flow field 46 formed on the first metal separator 24, and flows along the cathode 40 of the membrane electrode assembly 22 to induce an electrochemical reaction at the cathode 40. The fuel gas flows from the fuel gas supply passage 34a into the fuel gas flow field 52 formed on the second metal separator 26, and flows along the anode 38 of the membrane electrode assembly 22 to induce an electrochemical reaction at the anode 38.

In the membrane electrode assembly 22, the oxygen-containing gas supplied to the cathode 40, and the fuel gas supplied to the anode 38 are consumed in the electrochemical reactions at the electrode catalyst layers of the cathode 40 and the anode 38 for generating electricity.

After the oxygen-containing gas is consumed at the cathode 40, the oxygen-containing gas is discharged into the oxygen-containing gas discharge-passage 30b, and flows in the direction indicated by the arrow A. Similarly, after the fuel gas is consumed at the anode 38, the fuel gas is discharged into the fuel gas discharge passage 34b, and flows in the direction indicated by the arrow A.

The coolant flows from the coolant supply passage 32a into the coolant flow field 58 of the second metal separator 26, and flows in the directions indicated by the arrows B and C. After the coolant is used for cooling the membrane electrode assembly 22, the coolant is discharged into the coolant discharge passage 32b.

In the embodiment of the present invention, the electrically conductive first heat insulation plate 14a is interposed between the terminal plate 16a and one end of the cell assembly 13, and the electrically conductive second heat insulation plate 14b is interposed between the terminal plate 16b and the other end of the cell assembly 13. The first and second heat insulation plates 14a, 14b are corrugated plates. The heat insulation air chambers 70 are defined between the first heat insulation plate 14a and the cell assembly 13, and the heat insulation air chambers 76 are defined between the second heat insulation plate 14b and the cell assembly 13. Thus, heat energy generated in the fuel cells (end cells) at opposite ends of the cell assembly 13 are not transmitted to the terminal plates 16a, 16b.

Since the first and second heat insulation plates 14a, 14b are electrically conductive corrugated plates, the areas of contact with the fuel cells at opposite ends of the cell assembly 13 is small, and heat resistance is large. During power generation of the fuel cells 12, heat energy is generated at the contact areas between the first and second heat insulation plates 14a, 14b and the first and second metal separators 24, 26 of the fuel cells 12 at the opposite ends of the cell assembly 13. The heat energy is used to raise the temperature of the membrane electrode assembly 22 rapidly. Thus, even if operation of the fuel cell stack 10 is started at a temperature below the freezing point, it is possible to prevent water produced in the chemical reaction of the fuel cell stack 10 from freezing due to the excessively low temperature of the membrane electrode assembly 22. Thus, operation of the fuel cell stack 12 can be started rapidly and desirably.

As shown in FIG. 4, the first protrusions 68 of the first heat insulation plate 14a extend across the first protrusions 62 of the first metal separator 24. When the first metal separator 24 and the first heat insulation plate 14a are stacked together, the first protrusions 62 and the first protrusions 68 are in contact with each other such that the first protrusions 62 extend across the first protrusions 68 to define the plurality of heat insulation air chambers 70. Thus, heat insulating characteristics are effectively improved, and the temperature of the fuel cell 12 in contact with the first heat insulation plate 14a is raised desirably in a short period of time.

Similarly, as shown in FIG. 5, the second protrusions 74 of the second heat insulation plate 14b extend across the second protrusions 64 of the second metal separator 26. When the second protrusions 74 are in contact with the second protrusion 74 with each other to define the plurality of heat insulation air chambers 76, the same advantage as with the first heat insulation plate 14a can be achieved.

Figure 6:
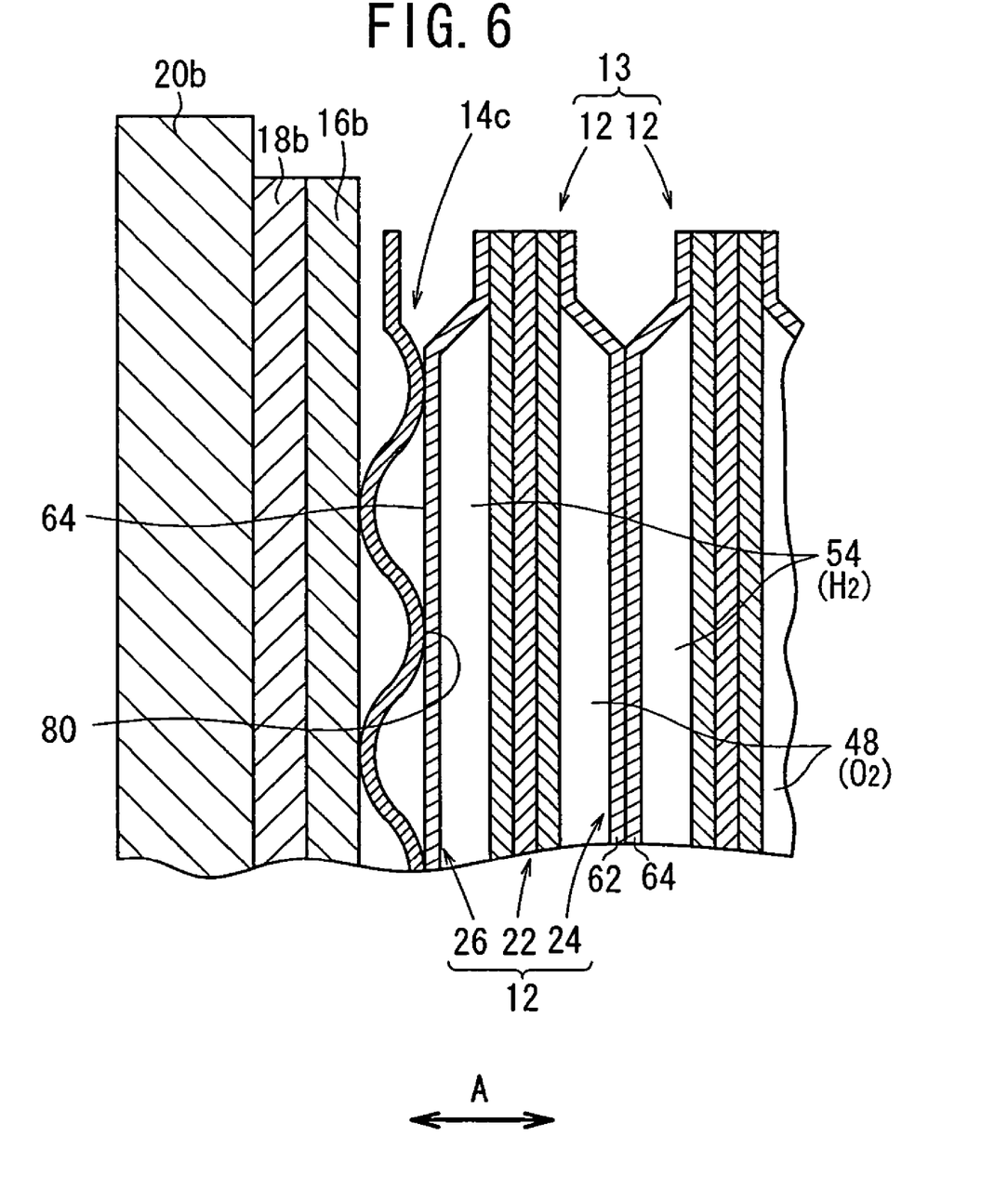
FIG. 6 is a cross sectional view showing a part of the fuel cell stack in which another heat insulation plate is provided.

Further, in the present embodiment, a heat insulation plate 14c as shown in FIG. 6 may be used to reduce the areas of contact between the first and second heat insulation plates 14a, 14b and the fuel cells 12, and to increase the heat resistance at the contact areas.

The heat insulation plate 14c is used in place of the second heat insulation plate 14b, for example. The heat insulation plate 14c has curved cross sections 80 which are in contact with the second protrusions 64 of the second metal separator 26. The curved sections 80 have a curved cross section. The curved sections 80 extend across the second protrusions 64, and in line contact with the second protrusions 64.

The area of contact between the second protrusions 64 of the second metal separator 26, and the curved sections 80 of the heat insulation plate 14c is very small, and the heat resistance is very large. When operation of the fuel stack 10 is started at a low temperature, the membrane electrode assembly 22 of the fuel cell 12 does not freeze, and the temperature of the fuel cell 12 can be raised desirably in a short period of time.

The heat insulation plate 14c may be used in place of the heat insulation plate 14a. In the present embodiment, the first and second heat insulation plates 14a, 14b, and the heat insulation plate 14c are gold plated. Alternatively, the heat insulation plates may be passivated to improve the electric resistance.

According to the present invention, the fuel cell stack has at least one electrically conductive heat insulation plate between an end of the cell assembly and the terminal plate for collecting electricity from the fuel cell stack. Heat insulation air chambers are defined between the heat insulation plate and the terminal plate so that heat energy generated in the fuel cells can be prevented from being transmitted to the terminal plate.

Since the heat insulation plates are electrically conductive corrugated plates, the areas of contact with the end cells is small, and heat resistance is large. Heat energy is generated at the contact areas between the heat insulation plates and the end cells. The heat energy is used to raise the temperature of the membrane electrode assembly rapidly. Thus, even if operation of the fuel cell stack 10 is started at a temperature below the freezing point, it is possible to prevent water produced in the chemical reaction of the fuel cell stack from freezing due to the excessively low temperature of the membrane electrode assembly. Thus, operation of the fuel cell stack can be started rapidly and desirably.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
   a cell assembly formed by stacking a plurality of fuel cells in a stacking direction, said fuel cells each including an electrolyte electrode assembly including a pair of electrodes and an electrolyte interposed between said electrodes, and separators for sandwiching said electrolyte electrode assembly;
   terminal plates provided outside opposite ends of said cell assembly in the stacking direction for collecting electricity from said fuel cell stack; and
   at least one electrically conductive heat insulation plate, said heat insulation plate interposed between one of said separators that is at an end of said cell assembly in the stacking direction and said terminal plate, said heat insulation plate directly contacting said one of said separators that is at said end of said cell assembly,
   wherein said heat insulation plate is a corrugated plate, and a heat insulation air chamber is defined between said heat insulation plate and said cell assembly,
   wherein said separators are corrugated metal plates.

2. A fuel cell stack according to claim 1, wherein protrusions for defining a fluid field extend along a surface of said separator provided at said end of said cell assembly in the stacking direction such that said protrusions for defining said fluid field face said heat insulation plate;
   protrusions extend along a surface of said insulation plate for defining a heat insulation space; and
   said protrusions for defining said fluid field and said protrusions for defining said heat insulation space are in contact with each other.

3. A fuel cell stack according to claim 2, wherein said protrusions for defining said fluid field extend across said protrusions for defining said heat insulation space.

4. A fuel cell stack according to claim 2, wherein said protrusion for defining said heat insulation space has a curved cross section.

* * * * *